United States Patent Office 3,111,531
Patented Nov. 19, 1963

3,111,531
NOVEL 2,4,6-TRIS(N-ALKOXYSULFAMYL)
ANILINE
John J. Traverso and Calvert W. Whitehead, Indianapolis, Ind., assignors to Eli Lilly and Company, Indianapolis, Ind., a corporation of Indiana
No Drawing. Filed Mar. 15, 1962, Ser. No. 180,025
6 Claims. (Cl. 260—397.7)

This invention relates to novel substituted anilines and to the preparation and therapeutic use thereof. More particularly, the novel components of this invention are sulfamyl-substituted anilines having therapeutic use in the relief of hypertension, as well as in the promotion of diuresis.

An object of this invention is, therefore, to provide these novel sulfamylaniline compounds. A further object is to provide methods for the preparation and therapeutic use of the novel compounds of this invention. These and other objects are described more fully hereinafter.

The novel anilines of this invention are substituted alkoxysulfamylanilines wherein the nitrogen of the amino group of said aniline is primary, secondary, or tertiary—the substituents on said nitrogen being hydrogen or lower alkyl (i.e., containing from 1 to about 4 carbon atoms). The following formula is representative.

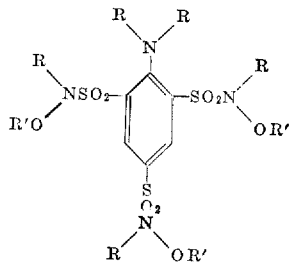

wherein R is hydrogen or lower alkyl, and R' is lower alkyl.

Thus, an embodiment of this invention is a 2,4,6-tris-(N-alkoxysulfamyl)aniline, containing no further substitution and wherein the alkoxy moiety generally contains from 1 to about 4 carbon atoms. An example is 2,4,6-tris(N-methoxysulfamyl)aniline. Another embodiment is a 2,4,6-tris(N-alkoxylsulfamyl)aniline, wherein at least one of the hydrogen atoms of the amino group of said aniline is substituted with lower alkyl—exemplified by 2,4,6-tris(N-methoxysulfamyl)-N,N-dimethylaniline. In the above embodiments, the nitrogen of the amino group can be primary, secondary, or tertiary.

The novel compounds of this invention possess significant hypotensive activity and, although exhibiting diuretic properties, are, nevertheless, what may be termed as "true hypotensive agents" and are useful as valuable therapeutic compounds for the alleviation and control of essential hypertension, malignant hypertension, and the like, as well as peripheral vascular disorders, such as Raynaud's disease and Buerger's disease. Furthermore, the diuretic activity of the compounds of this invention is a significant advantage, since the possible danger of fluid retention, an undesired effect of some hypotensives, is thereby obviated.

The novel sulfamyl-substituted anilines of this invention can conveniently be produced by reacting a halosulfonylaniline with an excess of an alkoxyamine, generally in the form of its acid addition salt, the reaction being conducted in the presence of an organic or inorganic base, such as trialkylamine, sodium hydroxide, ammonium hydroxide, and the like. The alkoxyamine salt and the base are generally employed in substantially equimolar quantities and the base in the form of an aqueous solution. The reaction normally proceeds to completion in about an hour, at a temperature of about 25° C. The final product can be obtained by evaporating the reaction mixture under reduced pressure to obtain a crude product which is then crystallized from alcohol to give excellent yields of the desired N-alkoxysulfamylaniline.

The following example is representative of the preparation of an N-alkoxysulfamylaniline of this invention.

EXAMPLE

*Preparation of 2,4,6-Tris(N-Methoxysulfamyl)Aniline*

Five grams of 2,4,6-tris(chlorosulfonyl)aniline were added portionwise to a stirred mixture of 10 g. of methoxyamine hydrochloride and 23 ml. of 55 percent trimethylamine. The resulting reaction was complete after 1 hour at room temperature. Evaporation under reduced pressure left a residue which was crystallized from alcohol to give 5 g., or 92 percent of theory, of 2,4,6-tris(N-methoxysulfamyl)aniline, melting at 182° C. (dec.).

Analysis.—Calculated for $C_9H_{16}N_4O_9S_3$: N, 13.35. Found: N, 13.19.

Thus, it can be seen that the novel compounds of this invention are conveniently produced by reacting a halosulfonylaniline with an alkoxyamine. These reactants can be represented by the following general formulae:

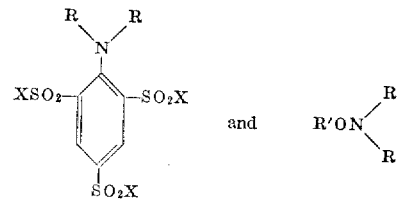

wherein R and R' are as defined hereinbefore, and X is halo, i.e., fluoro, bromo, chloro, or iodo. By employing the procedures outlined above and specifically set forth in the example, other alkoxysulfamylanilines of this invention are produced. For example, 2,4,6-tris(N-ethoxysulfamyl)aniline is prepared by the reaction of 1.5 moles of 2,4,6-tris(chlorosulfonyl)aniline with about 12 moles of ethoxyamine hydrochloride and about 12 moles of trimethylamine; 2,4,6-tris(N-propoxysulfamyl)aniline is prepared by the reaction of an excess of propoxyamine hydrochloride with 2,4,6-tris(chlorosulfonyl)aniline in the presence of 55 percent aqueous trimethylamine; the reaction of 2,4,6-tris(chlorosulfonyl)aniline with butoxyamine hydrochloride, in the presence of an aqueous solution of trimethylamine, yields 2,4,6-tris(N-butoxysulfamyl)aniline; 2,4,6-tris(N-methoxysulfamyl)-N,N-dimethylaniline is produced by reaction of about 1 mole of 2,4,6-tris(chlorosulfonyl)-N,N-trimethylaniline with 8 moles of methoxyamine hydrochloride dissolved in a trimethylamine solution. Similarly are prepared 2,4,6-tris(N-methoxysulfamyl)-N,N-diethylaniline; 2,4,6-tris(N-methoxysulfamyl)-N,N-dipropylaniline; 2,4,6-tris(N-methoxysulfamyl)-N,N-dibutylaniline; 2,4,6-tris(N-methoxysulfamyl)-N-methylaniline; and the like.

The term "lower alkyl" as employed herein signifies alkyl groups generally containing from 1 to about 4 carbon atoms. Thus, the term encompasses methyl, ethyl, propyl, isopropyl, butyl, isobutyl, secondary butyl, and tertiary butyl groups.

The compounds of this invention are excellent hypotensive agents and, thus, an embodiment of this invention is a process for treating hypertension wherein the improvement comprises employing an alkoxysulfamylaniline, as described herein. In general, the process comprises administering to a subject a therapeutically effective amount of an N-alkoxysulfamylaniline of this invention. Parenteral administration of solutions or suspensions of the subject compounds, such as by intravenous or intramuscular injection, can be employed—the latter technique being preferred. Furthermore, oral administration of the compounds of this invention can be employed, the active N-alkoxysulfamylaniline being administered in either capsule or tablet dosage form.

A therapeutic composition also forms another embodiment of this invention. Such a composition comprises a therapeutically effective amount of the N-alkoxysulfamylanilines described above and a pharmaceutical excipient. The dosage form of the therapeutic composition depends upon the technique chosen for administration. For example, for parenteral administration, as in intramuscular injection, the therapeutic composition comprises a therapeutically effective quantity of a compound of this invention dissolved or suspended in a suitable pharmaceutically acceptable medium, such as water, glucose solution, physiological saline, and the like. Therapeutic compositions suitable for oral administration can be in the oral dosage form of capsules or compressed tablets and comprise a therapeutically effective amount of the active N-alkoxysulfamylaniline and a pharmaceutical excipient, such as starch, sugar lactose, calcium carbonate, flavoring, and the like.

The compounds of this invention, in addition to their use in the treatment of hypertension, can be employed as diuretics. It is most significant in this regard that the subject compounds cause less potassium excretion than certain prior art diuretics which are particularly safe with regard to potassium depletion. The avoidance of potassium deficiency is extremely desirable, since potassium is necessary to cell function and deprivation can lead to eventual death.

For the treatment of adults in accordance with this invention, the hypotensive compound is administered in daily doses which range from about 1 mg. to about 250 mg., or somewhat more, depending upon the body weight of the patient. However, the optimum dosage naturally varies with individual patients and, accordingly, must be determined for each by trial and error. Smaller daily dosage amounts can be given in single doses, but larger amounts are given in divided dosages, most conveniently, at dinner times.

Further representative of the novel compounds of this invention are 2,4,6-tris(N-methoxysulfamyl)-N-ethylaniline; 2,4,6-tris(N-propoxysulfamyl)-N-butylaniline; 2,4,6-tris(N-ethoxysulfamyl)-N-propylaniline; 2,4,6-tris(N-butoxysulfamyl)-N-methylaniline; and the like.

We claim:
1. A compound of the formula:

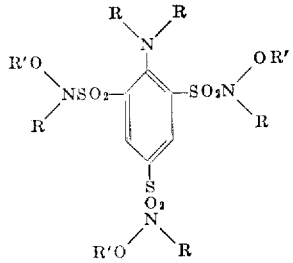

wherein R is selected from the group consisting of hydrogen and lower alkyl, and R' is lower alkyl.

2. 2,4,6-tris(N-lower alkoxysulfamyl)aniline.

3. A 2,4,6-tris(N-lower alkoxysulfamyl)aniline wherein the alkoxy moiety contains from one to four carbon atoms and wherein at least one of the hydrogen atoms of the amine group of said aniline is substituted with a lower alkyl.

4. 2,4,6-tris(N-methoxysulfamyl)amine.

5. 2,4,6-tris(N-ethoxysulfamyl)aniline.

6. 2,4,6-tris(N-lower alkoxysulfamyl)-N,N-dimethylaniline.

References Cited in the file of this patent

UNITED STATES PATENTS 3,052,706  Goldberg et al. _____ Sept. 4, 1962

UNITED STATES PATENT OFFICE
CERTIFICATE OF CORRECTION

Patent No. 3,111,531            November 19, 1963

John J. Traverso et al.

It is hereby certified that error appears in the above numbered patent requiring correction and that the said Letters Patent should read as corrected below.

Column 1, line 12, for "components" read -- compounds --; column 3, line 12, for "camprises" read -- comprises --; line 21, after "sugar" insert a comma; column 4, line 30, for "2,4,6-tris(N-methoxysulfamyl)amine" read -- 2,4,6-tris(N-methoxysulfamyl)aniline --.

Signed and sealed this 26th day of May 1964.

(SEAL)
Attest:

ERNEST W. SWIDER            EDWARD J. BRENNER
Attesting Officer            Commissioner of Patents